United States Patent
Steel et al.

(10) Patent No.: US 10,332,237 B2
(45) Date of Patent: *Jun. 25, 2019

(54) EQUATORIAL STITCHING OF HEMISPHERICAL IMAGES IN A SPHERICAL IMAGE CAPTURE SYSTEM

(71) Applicant: GoPro, Inc., San Mateo, CA (US)

(72) Inventors: Joseph Steel, London (GB); Timothy Macmillan, La Honda, CA (US)

(73) Assignee: GoPro, Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/056,370

(22) Filed: Aug. 6, 2018

(65) Prior Publication Data

US 2019/0043160 A1    Feb. 7, 2019

Related U.S. Application Data

(63) Continuation of application No. 15/234,869, filed on Aug. 11, 2016, now Pat. No. 10,043,237.

(60) Provisional application No. 62/204,290, filed on Aug. 12, 2015.

(51) Int. Cl.
    *G06T 3/00*          (2006.01)

(52) U.S. Cl.
    CPC .......... *G06T 3/0018* (2013.01); *G06T 3/0043* (2013.01)

(58) Field of Classification Search
    USPC ................................. 345/427, 441; 382/284
    See application file for complete search history.

(56) References Cited

U.S. PATENT DOCUMENTS

| | | | |
|---|---|---|---|
| 6,486,908 B1* | 11/2002 | Chen | G06T 3/0018 345/441 |
| 6,731,284 B1* | 5/2004 | Oxaal | G06T 3/0062 345/427 |
| 7,961,980 B2 | 6/2011 | Shih | |
| 8,331,725 B2* | 12/2012 | Forutanpour | G06T 3/4038 382/284 |
| 8,395,657 B2 | 3/2013 | Jacob | |
| 8,988,509 B1 | 3/2015 | Macmillan | |
| 9,087,256 B2 | 7/2015 | Yu | |
| 9,196,039 B2 | 11/2015 | Macmillan | |
| 9,197,885 B2 | 11/2015 | Sun | |
| 9,269,124 B2 | 2/2016 | Yagi | |
| 9,570,113 B2 | 2/2017 | Campbell | |
| 9,571,759 B1 | 2/2017 | Adsumilli | |
| 9,639,935 B1* | 5/2017 | Douady-Pleven | H04N 5/247 |
| 9,652,667 B2 | 5/2017 | Macmillan | |
| 9,661,245 B2 | 5/2017 | Kawano | |

(Continued)

*Primary Examiner* — Xuemei G Chen
(74) *Attorney, Agent, or Firm* — Gazdzinski & Associates, PC

(57) ABSTRACT

Hyper-hemispherical images may be combined to generate a rectangular projection of a spherical image having an equatorial stitch line along of a line of lowest distortion in the two images. First and second circular images are received representing respective hyper-hemispherical fields of view. A video processing device may project each circular image to a respective rectangular image by mapping an outer edge of the circular image to a first edge of the rectangular image and mapping a center point of the circular image to a second edge of the first rectangular image. The rectangular images may be stitched together along the edges corresponding to the outer edge of the original circular image.

20 Claims, 8 Drawing Sheets

(56) References Cited

U.S. PATENT DOCUMENTS

| | | |
|---|---|---|
| 9,754,179 B2 | 9/2017 | Hiraga |
| 9,792,709 B1 | 10/2017 | Meler |
| 9,866,752 B2 * | 1/2018 | Zhang ................. H04N 13/239 |
| 9,930,238 B2 * | 3/2018 | Annau .................... G11B 27/11 |
| 10,194,097 B2 * | 1/2019 | Abbas .................... H04N 5/265 |
| 2013/0021433 A1 | 1/2013 | Belsarkar |
| 2013/0235149 A1 | 9/2013 | Tanaka |
| 2014/0362176 A1 | 12/2014 | St. Clair |
| 2015/0278988 A1 | 10/2015 | Macmillan |
| 2016/0050370 A1 | 2/2016 | Campbell |
| 2016/0112713 A1 | 4/2016 | Russell |
| 2017/0019595 A1 | 1/2017 | Chen |
| 2017/0094169 A1 | 3/2017 | Yoshikawa |
| 2017/0110155 A1 * | 4/2017 | Campbell .............. H04N 9/806 |
| 2017/0230587 A1 | 8/2017 | Kanai |
| 2017/0287200 A1 | 10/2017 | Forutanpour |
| 2017/0331988 A1 | 11/2017 | Hollinger |
| 2018/0101931 A1 * | 4/2018 | Abbas .................. H04N 5/2258 |
| 2018/0144488 A1 * | 5/2018 | Kim .......................... G06T 7/30 |
| 2018/0199065 A1 * | 7/2018 | Adams ............. H04N 19/00575 |
| 2018/0365797 A1 * | 12/2018 | Yu ........................ G06T 3/0093 |

* cited by examiner

EQUATORIAL STITCHING OF HEMISPHERICAL IMAGES IN A SPHERICAL IMAGE CAPTURE SYSTEM

PRIORITY

This application is a continuation of, and claims the benefit of priority to, co-owned and co-pending U.S. patent application Ser. No. 15/234,869 filed Aug. 11, 2016 of the same title, which claims the benefit of priority to U.S. Provisional Patent Application Ser. No. 62/204,290 filed on Aug. 12, 2015 of the same title, each of the foregoing being incorporated herein by reference in its entirety.

BACKGROUND

Technical Field

This disclosure relates to image stitching, and more specifically, to generating a spherical image from multiple sub-images.

Description of the Related Art

Spherical images are typically obtained by capturing multiple images with overlapping fields of view from different cameras and combining the images together. Conventional stitching algorithms may result in undesirable artifacts around the stitch lines due to imperfections in the stitching process. These artifacts may be exacerbated by distortion introduced in the original pre-stitched images when the images are projected to rectangular images.

SUMMARY

In one aspect, a camera apparatus is disclosed. In one embodiment, the camera apparatus is configured to stitch hyper-hemispherical images and includes: a first camera that faces a first direction, the first camera configured to capture a first circular image corresponding to a first hyper-hemispherical field of view; a second camera that faces a second direction, the second camera configured to capture a second circular image corresponding a second hyper-hemispherical field of view; a processing apparatus; and a non-transitory computer-readable apparatus. The non-transitory computer-readable apparatus includes a storage medium having instructions for stitching the first and the second hyper-hemispherical fields of view to generate a rectangular projection of a spherical image, the instructions when executed by the processing apparatus, cause the processing apparatus to: receive the first circular image corresponding to the first hyper-hemispherical field of view captured by the first camera facing the first direction and the second circular image corresponding to the second hyper-hemispherical field of view captured by the second camera facing the second direction; project the first circular image to a first rectangular image via a map of an outer edge of the first circular image to a bottom edge of the first rectangular image and a map of a center point of the first circular image to a top edge of the first rectangular image; project the second circular image to a second rectangular image via a map of an outer edge of the second circular image to a top edge of the second rectangular image and a map of a center point of the second circular image to a bottom edge of the second rectangular image; and stitch the bottom edge of the first rectangular image with the top edge of the second rectangular image to generate the rectangular projection of the spherical image.

In one variant, the stitch of the bottom edge of the first rectangular image with the top edge of the second rectangular image further includes an alignment of features in a first overlapping range of the first rectangular image near the bottom edge with features in a corresponding second overlapping range of the second rectangular image near the top edge.

In another variant, the instructions when executed by the processing apparatus, cause the processing apparatus to re-orient the rectangular projection to generate a re-orientated rectangular projection in which a center of the first circular image corresponds to a center point of the re-oriented rectangular projection.

In yet another variant, the projection of the first circular image further includes a map of each concentric ring of pixels in the first circular image to respective rows of pixels, wherein concentric rings from a center of the first circular image to an edge of the first circular image are mapped from a top row to a bottom row; and horizontally stretch the rows of pixels to fill a fixed size rectangle.

In yet another variant, the projection of the second circular image includes a map of each concentric ring of pixels in the second circular image to respective rows of pixels, wherein concentric rings from a center of the second circular image to an edge of the second circular image are mapped from a bottom row to a top row; and horizontally stretch the rows of pixels to fill a fixed size rectangle.

In yet another variant, a stitch line between the first rectangular image and the second rectangular image corresponds to boundaries between the first hyper-hemispherical field of view and the second hyper-hemispherical field of view.

In yet another variant, the first rectangular image includes a 360 degree field of view in the horizontal direction and a 90+n degree field of view in the vertical direction, where n is an amount of overlap between the first hyper-hemispherical field of view and the second hyper-hemispherical field of view.

In yet another variant, the first direction faces a different direction than the second direction.

In yet another variant, the first camera and the second camera are disposed in a back-to-back orientation.

In yet another variant, the rectangular projection of the spherical image includes a polar view of the spherical image and a stitch line resultant from the stitch of the bottom edge of the first rectangular image with the top edge of the second rectangular image includes an equatorial stitch line.

In another aspect, a computing device is disclosed. In one embodiment, the computing device is configured to stitch hyper-hemispherical images and includes: a processing apparatus; and a non-transitory computer-readable apparatus. The non-transitory computer-readable apparatus includes a storage medium having instructions for stitching the first and the second hyper-hemispherical fields of view to generate a rectangular projection of a spherical image, the instructions when executed by the processing apparatus, cause the processing apparatus to: receive a first circular image corresponding to a first hyper-hemispherical field of view captured by a first camera facing a first direction and a second circular image corresponding to a second hyper-hemispherical field of view captured by a second camera facing a second direction; project the first circular image to a first rectangular image via a map of an outer edge of the first circular image to a bottom edge of the first rectangular image and a map of a center point of the first circular image to a top edge of the first rectangular image; project the second circular image to a second rectangular image via a map of an outer edge of the second circular image to a top edge of the second rectangular image and a map of a center point of the second circular image to a bottom edge of the second rectangular image; and stitch the bottom edge of the first rectangular image with the top edge of the second rectangular image to generate the rectangular projection of the spherical image.

In one variant, the stitch of the bottom edge of the first rectangular image with the top edge of the second rectangular image further includes an alignment of features in a first overlapping range of the first rectangular image near the bottom edge with features in a corresponding second overlapping range of the second rectangular image near the top edge.

In another variant, the instructions when executed by the processing apparatus, cause the processing apparatus to re-orient the rectangular projection to generate a re-orientated rectangular projection in which a center of the first circular image corresponds to a center point of the re-oriented rectangular projection.

In yet another variant, the projection of the first circular image further includes a map of each concentric ring of pixels in the first circular image to respective rows of pixels, wherein concentric rings from a center of the first circular image to an edge of the first circular image are mapped from a top row to a bottom row; and horizontally stretch the rows of pixels to fill a fixed size rectangle.

In yet another variant, the projection of the second circular image includes a map of each concentric ring of pixels in the second circular image to respective rows of pixels, wherein concentric rings from a center of the second circular image to an edge of the second circular image are mapped from a bottom row to a top row; and horizontally stretch the rows of pixels to fill a fixed size rectangle.

In yet another variant, a stitch line between the first rectangular image and the second rectangular image corresponds to boundaries between the first hyper-hemispherical field of view and the second hyper-hemispherical field of view.

In yet another variant, the first rectangular image includes a 360 degree field of view in the horizontal direction and a 90+n degree field of view in the vertical direction, where n is an amount of overlap between the first hyper-hemispherical field of view and the second hyper-hemispherical field of view.

In yet another variant, the computing device further includes a display driver configured to display a portion of the rectangular projection of the spherical image.

In yet another variant, the rectangular projection of the spherical image includes a polar view of the spherical image and a stitch line resultant from the stitch of the bottom edge of the first rectangular image with the top edge of the second rectangular image includes an equatorial stitch line.

In yet another variant, the stitch line resides within an area of the first hyper-hemispherical field of view and the second hyper-hemispherical field of view that has a lower amount of distortion as compared with other areas of the first hyper-hemispherical field of view and the second hyper-hemispherical field of view.

BRIEF DESCRIPTIONS OF THE DRAWINGS

The disclosed embodiments have other advantages and features which will be more readily apparent from the following detailed description of the invention and the appended claims, when taken in conjunction with the accompanying drawings, in which:

DETAILED DESCRIPTION

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

A pair of hyper-hemispherical images may be combined to generate a rectangular projection of a spherical image having an equatorial stitch line along of a line of lowest distortion in the two images. A first circular image may be received corresponding to first hyper-hemispherical field of view capturing by a first camera facing a first direction and second circular image may be received corresponding to second hyper-hemispherical field of view captured by a second camera facing a second direction opposite the first direction. A video processing device may project the first circular image to a first rectangular image by mapping an outer edge of the first circular image to a bottom edge of the first rectangular image and mapping a center point of the first circular image to a top edge of the first rectangular image. The video processing device may project the second circular image to a second rectangular image by mapping an outer edge of the second circular image to a top edge of the second rectangular image and mapping a center point of the second circular image to a bottom edge of the second rectangular image. The bottom edge of the first rectangular image may be stitched with the top edge of the second rectangular image to generate the rectangular projection of the spherical image.

Example Camera System

Figure 1:
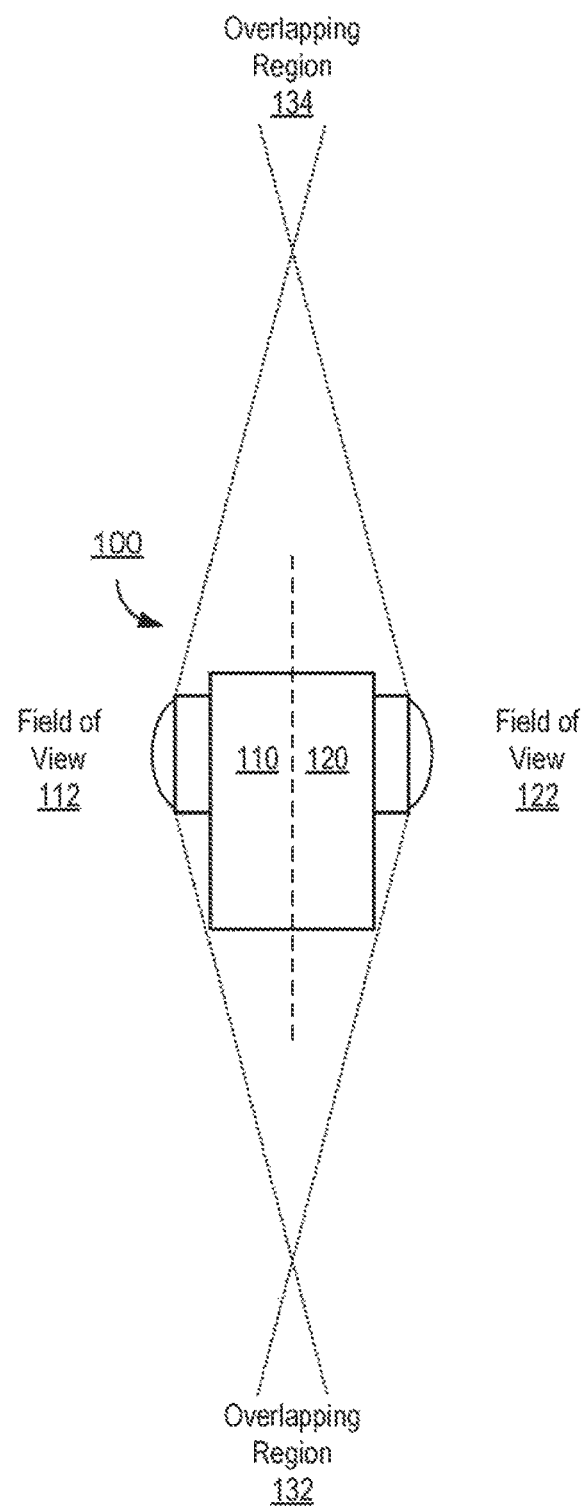
FIG. 1 illustrates an example embodiment of a spherical camera system.

FIG. 1 illustrates an embodiment of an example spherical camera system 100 that may include a first camera 110 capturing a first field of view 112 and a second camera 120 capturing a second field of view 122. In an embodiment, the cameras 110, 120 may be integrated in a back-to-back configuration in which cameras 110, 120 face opposite directions. For example, in operation, the first camera 110 may be a "front-facing" camera 110 that a user may point towards an object or scene of interest and the second camera 120 comprises a "rear-facing" camera facing in an opposite direction of the front-facing camera 110. While the designations of front-facing and rear-facing are useful in describing the example processes herein, these designations are arbitrary and the camera system 100 may operate in any orientation. The fields of view 112, 122 may each comprise a hyper-hemispherical field of view that captures slightly greater than a 180° range in at least one direction. Because the respective fields of view 112, 122 are hyper-hemispherical, they overlap in overlapping regions 132, 134 near their respective boundaries. For example, the fields of view 112, 122 may overlap by n degrees. These overlapping regions 132, 134 may be used for stitching images captured by the respective cameras 110, 120, as will be described in further detail below.

Example Stitching Methods

The processes described herein may be performed by a video processing system comprising a non-transitory computer-readable storage medium and at least one processor. The non-transitory computer-readable storage medium stores instructions that when executed cause the at least one processor to perform the processes described herein. In an embodiment, the video processing system may be partially or wholly implemented in the camera 100 or may be implemented partially or wholly in an external device.

Figure 2A:
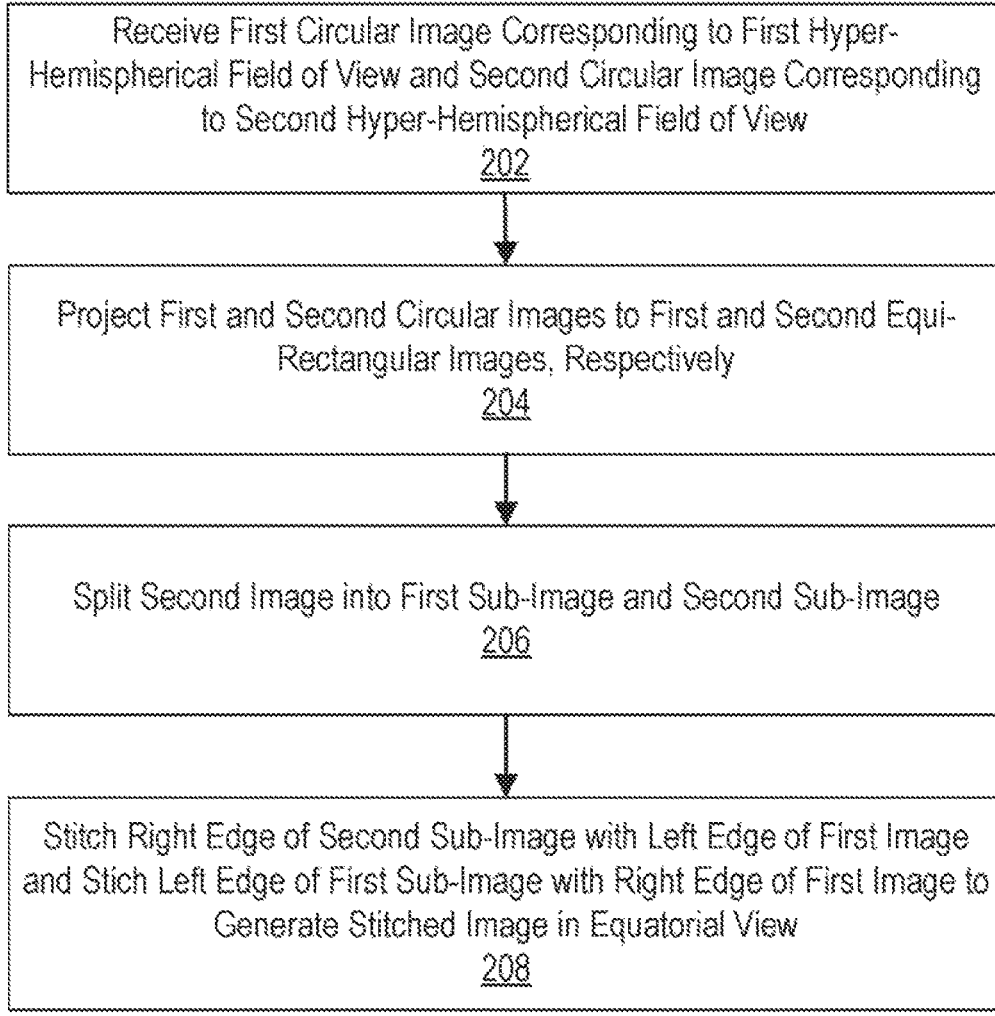
FIG. 2A illustrates a first example embodiment of a process for generating a rectangular projection of a spherical image.
Figure 2B:
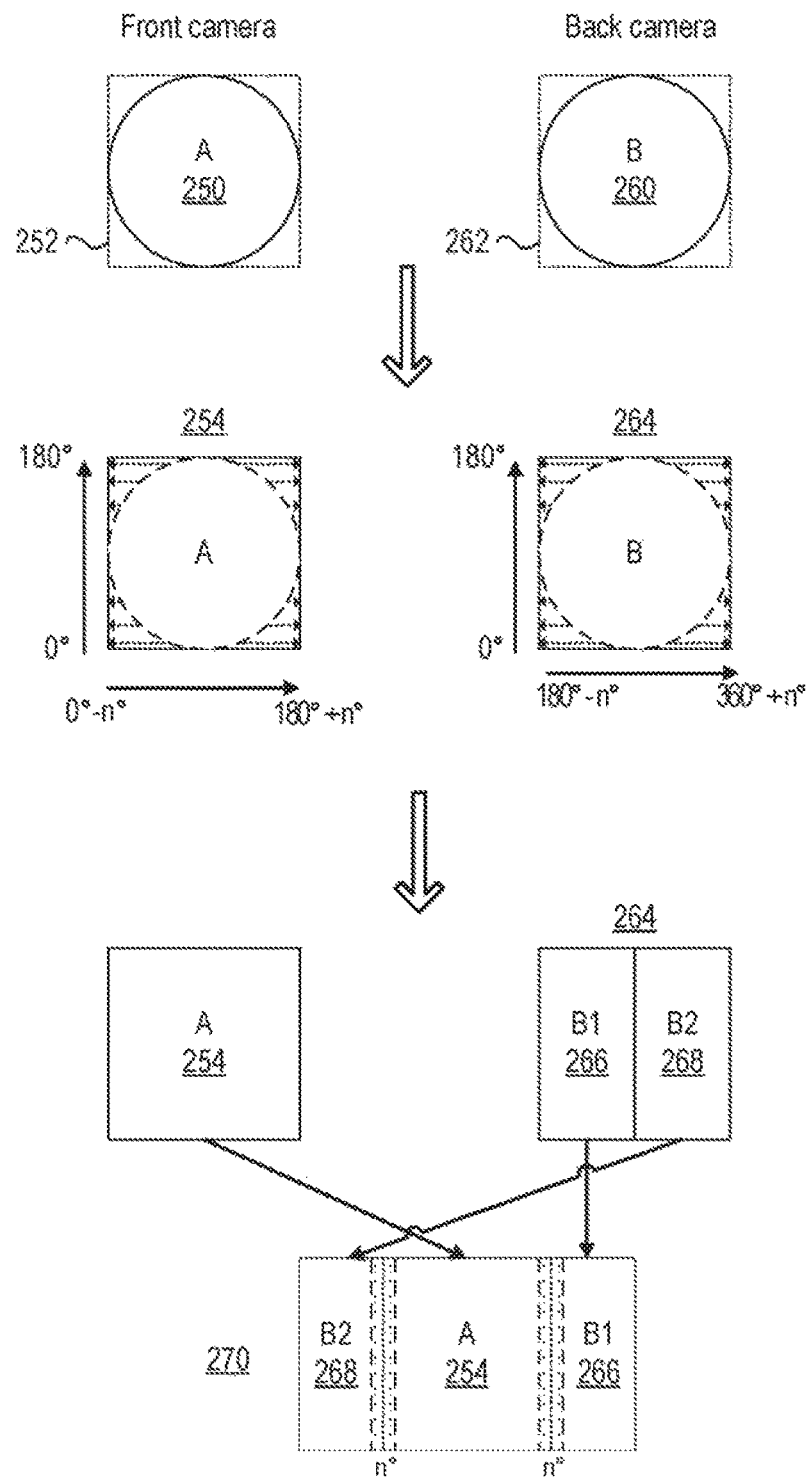
FIG. 2B illustrates a sequence of example images resulting from a first embodiment of a process for generating a rectangular projection of a spherical image.

FIG. 2A illustrates a first embodiment of a process for stitching images captured by a spherical camera system 100. FIG. 2B illustrates example images resulting from the process of FIG. 2A. FIGS. 2A and 2B are described together for clarity and convenience.

A first circular image (e.g., image "A") 250 and a second circular image (e.g., image "B") 260 may be received at a video processing system. The first circular image 250 may represent, for example, the field of view captured by a first camera 110 (e.g., a front-facing camera) of a spherical camera system 100 and the second circular image 260 may represent, for example, the field of view captured by the second camera 120 (e.g., a rear-facing camera) of a spherical camera system 100. The images 250, 260 are circular because they represent the entire fields of view seen by the respective cameras 110, 120 as opposed to a cropped rectangular field of view captured by a traditional camera. In an embodiment, the circular images 250, 260 may be captured by using only a circular region of a respective square or rectangular image sensor 252, 262. Alternatively, the circular images 250, 260 may be captured using respective circular image sensors. The circular images 250, 260 may each represent a hyper-hemispherical field of view (e.g., n degrees greater than a hemisphere in at least one direction). Thus there may be some overlap in the respective fields of view near the edges of the images 250, 260. This overlap can be used to align features for stitching as will be described in further detail below.

The first circular image 250 and the second circular image 260 may be projected to a first equi-rectangular image 254 and a second equi-rectangular image 264 respectively, using equi-rectangular projections. In these projections, the circular images 250, 260 may each be stretched horizontally to fill a square. As a result of this project, the equi-rectangular images 254, 264 may become increasingly more distorted as the top and bottom edges are approached. For example, the center row of pixels may not undergo any stretching during the projection, while the top and bottom row in the original circular image (which may each be represented by a respective single pixel) may be stretched to fill the entire top and bottom rows respectively of the equi-rectangular projections 254, 264. The resulting equi-rectangular images 254, 264 each may comprise an image representing a 180 degree field of view along the vertical axis and represent a 180+2n degree field of view along the horizontal axis, where n represents the degree of overlap between the fields of view of the original images 250, 260. For example, the first equi-rectangular image 254 may comprise a field of view in the range of 0–n degrees to 180+n degrees and the second equi-rectangular image 264 may comprise a field of view in the range of 180–n degrees to 360+n degrees along the horizontal axis.

The second image 264 may then be split 206 into a first sub-image 266 (e.g., a left sub-image) and a second sub-image (e.g., a right sub-image) 268. For example, the second image 264 may be divided vertically into two equal-sized sub-images 266, 268 in which the left sub-image 266 may represent the field of view 180–n degrees to 270 degrees and the right sub-image 268 may represent the field of view 270 degrees to 360+n degrees. The left sub-image 266 may then be stitched 208 to the right side of the first image 254 (e.g., by aligning features appearing in the n overlapping degrees near the left edge of the left-sub-image 266 with the features in the n overlapping degrees near the right edge of the first image 254), and the right sub-image 268 may be stitched 208 to the left side of the first image 254 (e.g., by aligning features appearing in the n overlapping degrees near the right edge of the right-sub-image 268 with the features in the n overlapping degrees near the left edge of the first image 254). The resulting image 270 (referred to herein as an "equatorial view" of the spherical image) provides a useful rectangular projection of the spherical field of view in which the center portion of the image 270 corresponds to the image 250 captured by the front-facing camera 110 and the left and right edges of the image 270 may correspond to the image 260 captured by the rear-facing camera 120. This orientation of the spherical image may be useful because many existing viewing and editing applications for spherical images assume that an image is received in this orientation.

An advantage of the method of FIGS. 2A-2B is that by projecting the spherical image to rectangular images 254, 264 prior to stitching, a conventional stitching algorithm designed for rectangular images can be used without requiring a specialized stitching algorithm that operates directly in the spherical domain. However, a potential problem with the above-described process is that the top and bottom of the stitch lines in the stitched image 270 correspond to portions of the equi-rectangular images 254, 264 that may be subject to the greatest distortion from the equi-rectangular projection. This can lead to errors in the stitching algorithm, which can result in undesirable artifacts near these top and bottom edges of the stitch lines.

Figure 3A:
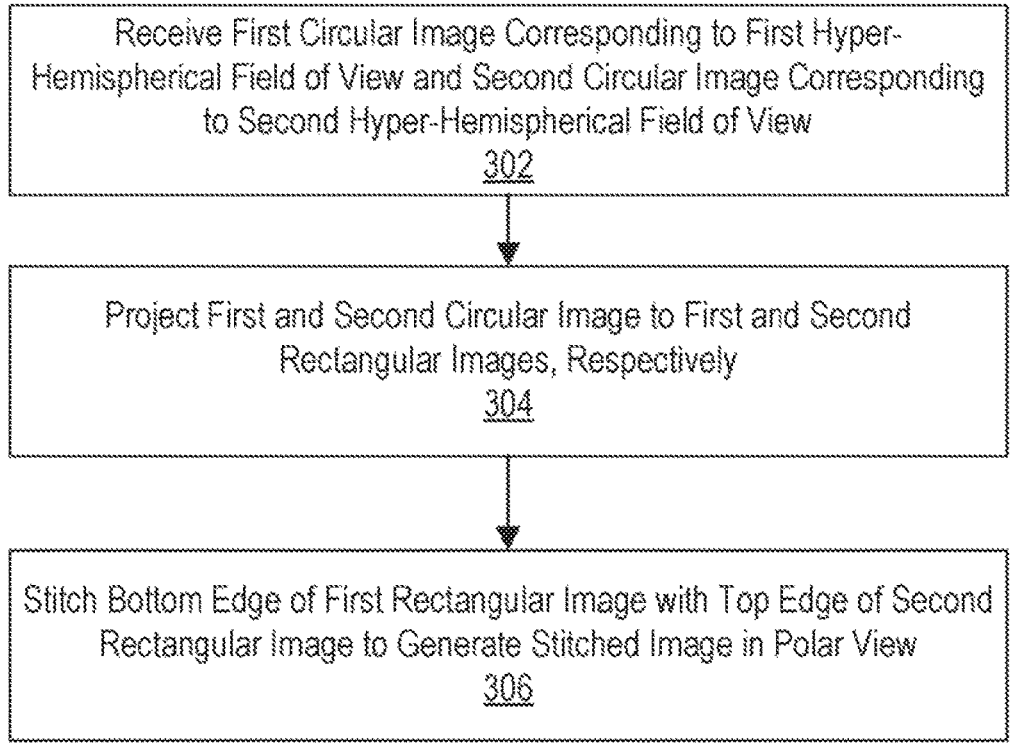
FIG. 3A illustrates a second example embodiment of a process for generating a rectangular projection of a spherical image.
Figure 3B:
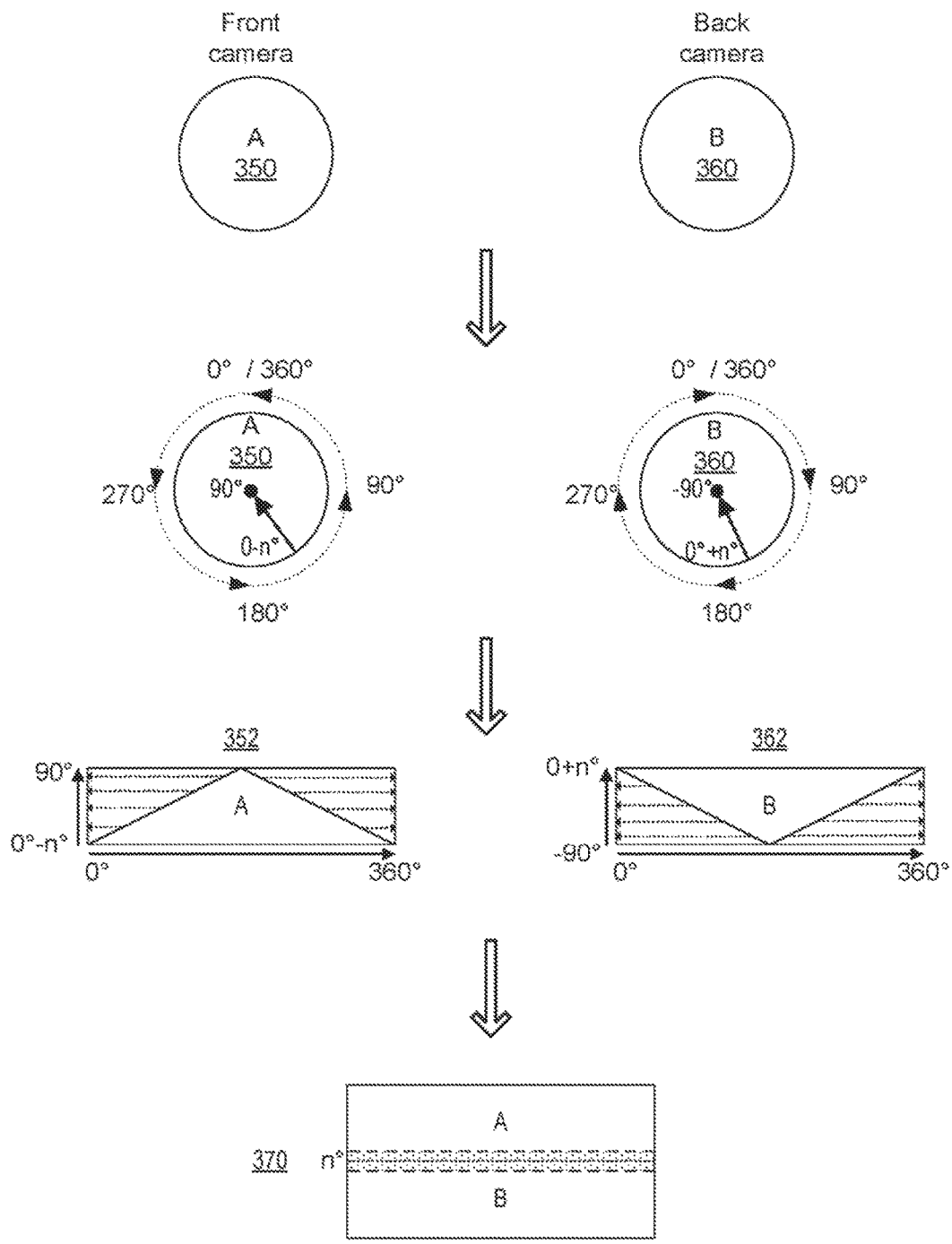
FIG. 3B illustrates a sequence of example images resulting from a second embodiment of a process for generating a rectangular projection of a spherical image.

FIGS. 3A and 3B illustrate a second embodiment of a process for stitching images in a spherical camera system that utilizes only a single stitch line and avoids the above-described problem by stitching along portions of the image that have a lowest amount of distortion. FIG. 3B illustrates example images resulting from the process of FIG. 3A. FIGS. 3A and 3B are described together for clarity and convenience.

A first circular image 350 and a second circular image 360 may be received 302 at a video processing system, which may be similar to the first circular image 250 and second circular image 260 respectively discussed above. The first circular image 350 and the second circular image 360 may be projected 304 to a first rectangular image 352 and a second rectangular image 362 respectively. Here, instead of using a conventional equi-rectangular projection, a projection may instead be used in which the outer edge of the circular image 350, 360 maps to a first horizontal edge of the rectangular image 352, 362 and a center point of the circular image 350, 360 maps to a second horizontal edge of the rectangular image 352, 362. Particularly, in the projection of the first circular image 350, the center point of the first circular image 350 maps to a top edge of the rectangular image 352 and the outer edge of the first circular image 350 maps to the bottom edge of the rectangular image 352. This projection may also be understood as taking increasing larger concentric rings of pixels from the circular image 350 and arranging them in rows (e.g., forming a triangle in which the center point represents the vertex of the triangle and the outer most ring represents the base of the triangle), which are then stretched to fill the rectangle. In this projection, the distortion in the rectangular image 352 due to stretching of the pixels increases near the top edge of the first rectangular image 352. Particularly, along the top edge, a single pixel (representing the center point of the original first circular image) may be stretched across the entire top edge, while along the bottom edge, no stretching may be performed. This may result in a rectangular image 352 representing a field of view from 0–n degrees to 90 degrees along the vertical axis (corresponding to the angles from the outer edge to the center point of the original circular image 350) and from 0 degrees to 360 degrees along the horizontal axis (corresponding to the angles around the circumference of the original circular image 350. In the projection of the second circular image 360, the center point of the second circular image 360 may be mapped to a bottom edge of the second rectangular image 362 and the outer edge of the second circular image 360 may be mapped to the top edge of the second rectangular image 360. Particularly, along the bottom edge of the second rectangular image 362, a single pixel (representing the center point of the original second circular image 360) may be stretched across the entire bottom edge, while along the top edge, no stretching may be performed.

The first rectangular image 352 and the second rectangular image 362 may then be stitched 306 together (e.g., by aligning the n overlapping degrees of the bottom edge of the first rectangular image 352 with the top edge of the second rectangular image 362). The resulting image 370 may be referred to as "polar view" of a spherical image. The stitch line may be referred to as an "equatorial stitch" because the stitched edges may correspond to an equator between the two hemispheres captured by the cameras 110, 120. As can be seen, in contrast to the stitching technique of FIGS. 2A-2B, only a single stitch line may be used and the stitch may be performed along edges of the images 352, 354 that have the least amount of distortion (e.g., no distortion) introduced from the rectangular projection. As a result, stitching artifacts caused by the projection distortion may be reduced or eliminated.

Figure 4A:
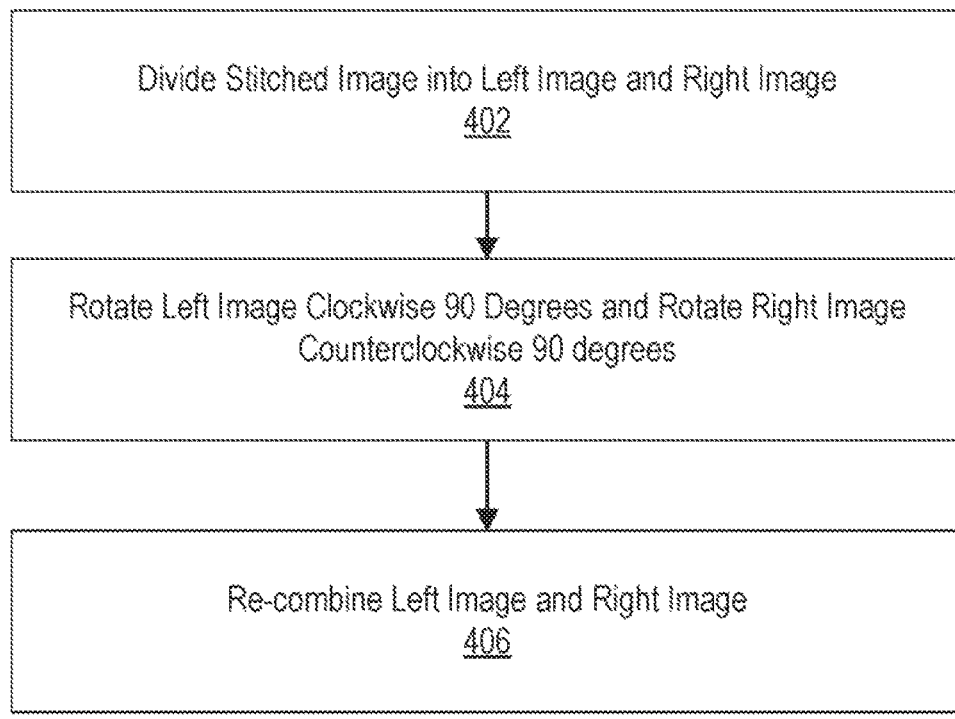
FIG. 4A illustrates an example embodiment of a process for re-orienting a rectangular projection of a spherical image.
Figure 4B:
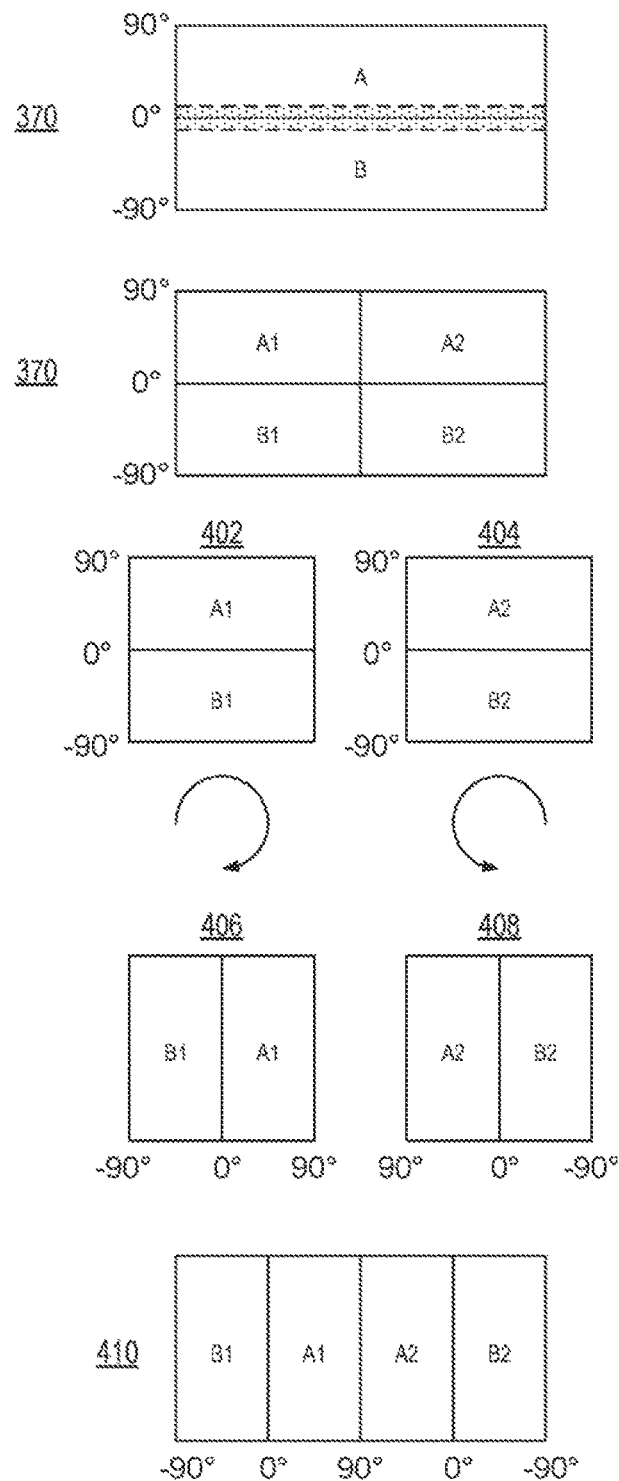
FIG. 4B illustrates a sequence of example images resulting from an embodiment of a process for re-orienting a rectangular projection of a spherical image.

The resulting stitched image 370 in the polar view may be converted to the equatorial view of FIG. 2B, in which the center line of the front-facing camera 110 represents the center line of the image and the center of the rear-facing camera 120 represents the left and right edges. FIG. 4A illustrates a process for re-projecting the image from the polar view to the equatorial view. FIG. 4B illustrates example images resulting from this process. FIGS. 4A-4B are described together herein for clarity and convenience.

In this process, the stitched image 370 may be divided 402 into left and right equally-sized sub-images 452, 454. The left sub-image 452 may be rotated 404 clockwise 90 degrees and the right sub-image 454 may be rotated 404 counter-clockwise 90 degrees. The rotated left sub-image 456 and the rotated right sub-image 458 may be re-combined 406 (e.g., by aligning the right edge of the rotated left sub-image 406 with the left edge of the rotated right sub-image 408) to generate the re-orientated image 410. This re-orientation may be useful to enable the spherical image to be processed using the same editing or viewing tools designed for use with the projection of FIG. 2B.

Example Machine Architecture

Figure 5:
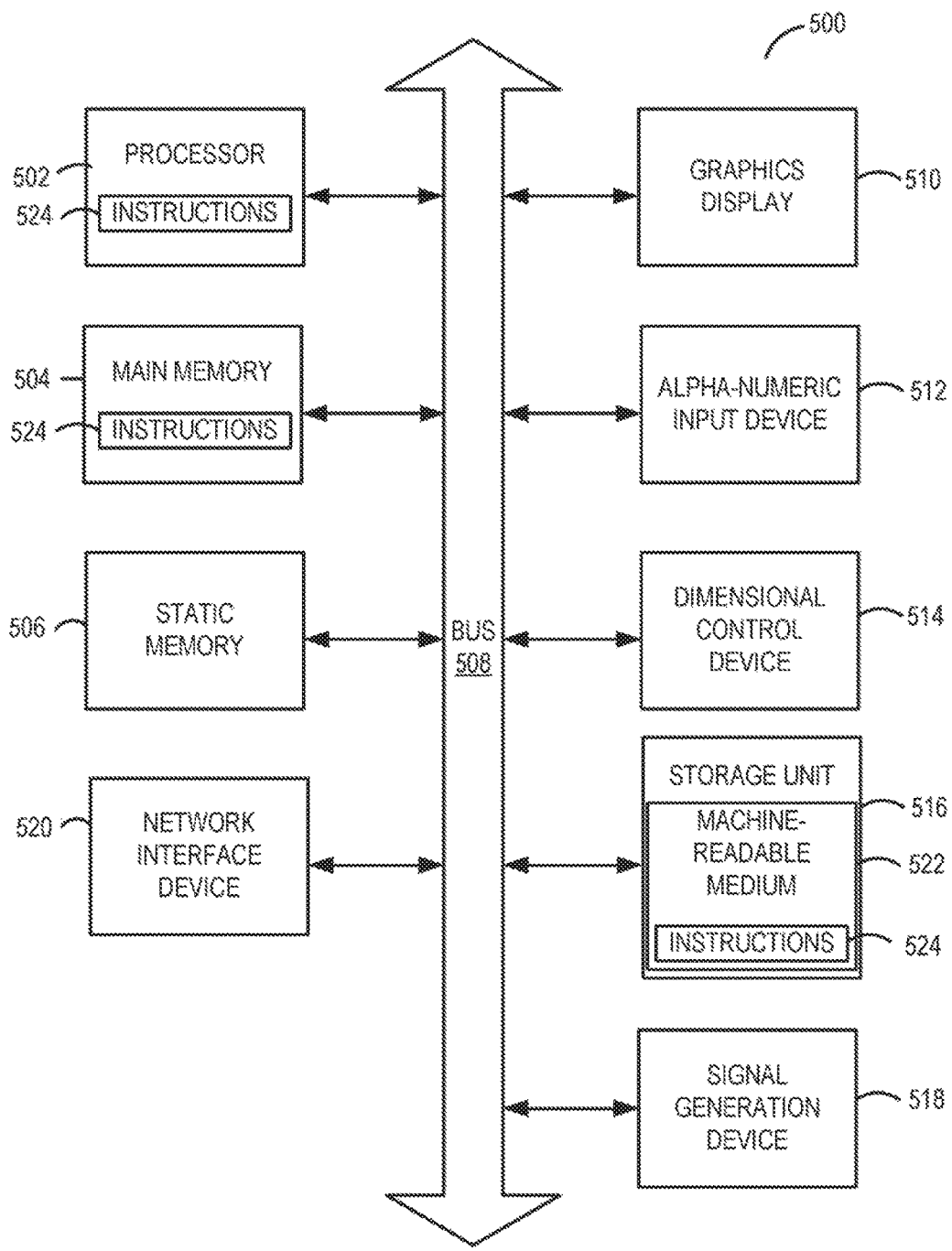
FIG. 5 illustrates an example embodiment of a video processing device.

FIG. 5 is a block diagram illustrating components of an example computing system able to read instructions from a computer-readable medium and execute them in one or more processors (or controllers). The computing system in FIG. 5 may represent an implementation of, for example, the video processing device for performing the stitching processes described herein.

The computing system 500 can be used to execute instructions 524 (e.g., program code or software) for causing the computing system 500 to perform any one or more of the methodologies. (or processes) described herein. In alternative embodiments, the computing system 500 operates as a standalone device or a connected (e.g., networked) device that connects to other computer systems. The computing system 500 may comprise, for example, a personal computer (PC), a tablet PC, a smart watch, or other device capable of executing instructions 524 (sequential or otherwise) that specify actions to be taken. In another embodiment, the computing system 500 may comprise a server. In a networked deployment, the computing system 500 may operate in the capacity of a server or client in a server-client network environment, or as a peer device in a peer-to-peer (or distributed) network environment. Further, while only a single computer system 500 is illustrated, a plurality of computing systems 500 may operate to jointly execute instructions 524 to perform any one or more of the methodologies discussed herein.

The example computing system 500 includes one or more processing units (generally processor 502). The processor 502 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The computing system 500 also includes a main memory 504. The computing system 500 may include a storage unit 516. The processor 502, memory 504 and the storage unit 516 communicate via a bus 508.

In addition, the computing system 500 can include a static memory 506, a display driver 510 (e.g., to drive a plasma display panel (PDP), a liquid crystal display (LCD), or a projector). The computing system 500 may also include input/output devices, e.g., an alphanumeric input device 512 (e.g., touch screen-based keypad or an external input device such as a keyboard), a dimensional (e.g., 2-D or 3-D) control device 514 (e.g., a touch screen or external input device such as a mouse, a trackball, a joystick, a motion sensor, or other pointing instrument), a signal generation device 518 (e.g., a speaker), and a network interface device 520, which also are configured to communicate via the bus 508. Embodiments of the computing system 500 corresponding to a client device may include a different configuration than an embodiment of the computing system 500 corresponding to a server. For example, an embodiment corresponding to a server may include a larger storage unit 516, more memory 504, and a faster processor 502 but may lack the display driver 510, input device 512, and dimensional control device 514.

The storage unit 516 includes a computer-readable medium 311 on which is stored instructions 524 (e.g., software) embodying any one or more of the methodologies or functions described herein. The instructions 524 may also reside, completely or at least partially, within the main memory 504 or within the processor 502 (e.g., within a processor's cache memory) during execution thereof by the computing system 500, the main memory 504 and the processor 502 also constituting computer-readable media. The instructions 524 may be transmitted or received over a network 526 via the network interface device 520.

While computer-readable medium 522 is shown in an example embodiment to be a single medium, the term "computer-readable medium" should be taken to include a single medium or multiple media (e.g., a centralized or distributed database, or associated caches and servers) able to store the instructions 524. The term "computer-readable medium" shall also be taken to include any medium that is capable of storing instructions 524 for execution by the computing system 500 and that cause the computing system 500 to perform any one or more of the methodologies disclosed herein. The term "computer-readable medium" includes, but not be limited to, data repositories in the form of solid-state memories, optical media, and magnetic media.

Additional Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for the embodiments herein through the disclosed principles. Thus, while particular embodiments and applications have been illustrated and described, it is to be understood that the disclosed embodiments are not limited to the precise construction and components disclosed herein. Various apparent modifications, changes, and variations may be made in the arrangement, operation and details of the method and apparatus disclosed herein without departing from the scope defined in the appended claims.

The invention claimed is:

1. A camera apparatus configured to stitch hyper-hemispherical images, the camera apparatus, comprising:
 a first camera that faces a first direction, the first camera configured to capture a first circular image corresponding to a first hyper-hemispherical field of view;
 a second camera that faces a second direction, the second camera configured to capture a second circular image corresponding a second hyper-hemispherical field of view;
 a processing apparatus; and
 a non-transitory computer-readable apparatus comprising a storage medium having instructions for stitching the first and the second hyper-hemispherical fields of view to generate a rectangular projection of a spherical image, the instructions when executed by the processing apparatus, cause the processing apparatus to:
  receive the first circular image corresponding to the first hyper-hemispherical field of view captured by the first camera facing the first direction and the second circular image corresponding to the second hyper-hemispherical field of view captured by the second camera facing the second direction;
  project the first circular image to a first rectangular image via a map of an outer edge of the first circular image to a bottom edge of the first rectangular image and a map of a center point of the first circular image to a top edge of the first rectangular image;

project the second circular image to a second rectangular image via a map of an outer edge of the second circular image to a top edge of the second rectangular image and a map of a center point of the second circular image to a bottom edge of the second rectangular image; and stitch the bottom edge of the first rectangular image with the top edge of the second rectangular image to generate the rectangular projection of the spherical image.

2. The camera apparatus of claim 1, wherein the stitch of the bottom edge of the first rectangular image with the top edge of the second rectangular image further comprises:

an alignment of features in a first overlapping range of the first rectangular image near the bottom edge with features in a corresponding second overlapping range of the second rectangular image near the top edge.

3. The camera apparatus of claim 1, wherein the instructions when executed by the processing apparatus, cause the processing apparatus to:

re-orient the rectangular projection to generate a re-orientated rectangular projection in which a center of the first circular image corresponds to a center point of the re-oriented rectangular projection.

4. The camera apparatus of claim 1, wherein the projection of the first circular image further comprises:

a map of each concentric ring of pixels in the first circular image to respective rows of pixels, wherein concentric rings from a center of the first circular image to an edge of the first circular image are mapped from a top row to a bottom row; and horizontally stretch the rows of pixels to fill a fixed size rectangle.

5. The camera apparatus of claim 4, wherein the projection of the second circular image comprises:

a map of each concentric ring of pixels in the second circular image to respective rows of pixels, wherein concentric rings from a center of the second circular image to an edge of the second circular image are mapped from a bottom row to a top row; and horizontally stretch the rows of pixels to fill a fixed size rectangle.

6. The camera apparatus of claim 1, wherein a stitch line between the first rectangular image and the second rectangular image corresponds to boundaries between the first hyper-hemispherical field of view and the second hyper-hemispherical field of view.

7. The camera apparatus of claim 1, wherein the first rectangular image comprises a 360 degree field of view in the horizontal direction and a 90+n degree field of view in the vertical direction, where n is an amount of overlap between the first hyper-hemispherical field of view and the second hyper-hemispherical field of view.

8. The camera apparatus of claim 1, wherein the first direction faces a different direction than the second direction.

9. The camera apparatus of claim 8, wherein the first camera and the second camera are disposed in a back-to-back orientation.

10. The camera apparatus of claim 9, wherein the rectangular projection of the spherical image comprises a polar view of the spherical image and a stitch line resultant from the stitch of the bottom edge of the first rectangular image with the top edge of the second rectangular image comprises an equatorial stitch line.

11. A computing device configured to stitch hyper-hemispherical images, the computing device, comprising:

a processing apparatus; and a non-transitory computer-readable apparatus comprising a storage medium having instructions for stitching the first and the second hyper-hemispherical fields of view to generate a rectangular projection of a spherical image, the instructions when executed by the processing apparatus, cause the processing apparatus to:

receive a first circular image corresponding to a first hyper-hemispherical field of view captured by a first camera facing a first direction and a second circular image corresponding to a second hyper-hemispherical field of view captured by a second camera facing a second direction;

project the first circular image to a first rectangular image via a map of an outer edge of the first circular image to a bottom edge of the first rectangular image and a map of a center point of the first circular image to a top edge of the first rectangular image;

project the second circular image to a second rectangular image via a map of an outer edge of the second circular image to a top edge of the second rectangular image and a map of a center point of the second circular image to a bottom edge of the second rectangular image; and stitch the bottom edge of the first rectangular image with the top edge of the second rectangular image to generate the rectangular projection of the spherical image.

12. The computing device of claim 11, wherein the stitch of the bottom edge of the first rectangular image with the top edge of the second rectangular image further comprises:

an alignment of features in a first overlapping range of the first rectangular image near the bottom edge with features in a corresponding second overlapping range of the second rectangular image near the top edge.

13. The computing device of claim 11, wherein the instructions when executed by the processing apparatus, cause the processing apparatus to:

re-orient the rectangular projection to generate a re-orientated rectangular projection in which a center of the first circular image corresponds to a center point of the re-oriented rectangular projection.

14. The computing device of claim 11, wherein the projection of the first circular image further comprises:

a map of each concentric ring of pixels in the first circular image to respective rows of pixels, wherein concentric rings from a center of the first circular image to an edge of the first circular image are mapped from a top row to a bottom row; and horizontally stretch the rows of pixels to fill a fixed size rectangle.

15. The computing device of claim 14, wherein the projection of the second circular image comprises:

a map of each concentric ring of pixels in the second circular image to respective rows of pixels, wherein concentric rings from a center of the second circular image to an edge of the second circular image are mapped from a bottom row to a top row; and horizontally stretch the rows of pixels to fill a fixed size rectangle.

16. The computing device of claim 11, wherein a stitch line between the first rectangular image and the second rectangular image corresponds to boundaries between the first hyper-hemispherical field of view and the second hyper-hemispherical field of view.

17. The computing device of claim 11, wherein the first rectangular image comprises a 360 degree field of view in the horizontal direction and a 90+n degree field of view in the vertical direction, where n is an amount of overlap between the first hyper-hemispherical field of view and the second hyper-hemispherical field of view.

18. The computing device of claim 11, wherein the computing device further comprises a display driver configured to display a portion of the rectangular projection of the spherical image.

19. The computing device of claim 18, wherein the rectangular projection of the spherical image comprises a polar view of the spherical image and a stitch line resultant from the stitch of the bottom edge of the first rectangular image with the top edge of the second rectangular image comprises an equatorial stitch line.

20. The computing device of claim 18, wherein the stitch line resides within an area of the first hyper-hemispherical field of view and the second hyper-hemispherical field of view that has a lower amount of distortion as compared with other areas of the first hyper-hemispherical field of view and the second hyper-hemispherical field of view.

\* \* \* \* \*